United States Patent
Schulz et al.

(10) Patent No.: US 8,728,207 B2
(45) Date of Patent: May 20, 2014

(54) METHOD AND SYSTEM FOR SEPARATING MERCURY FROM WASTE GASES OF A CEMENT PRODUCTION PROCESS

(76) Inventors: Dietmar Schulz, Beckum (DE); Ludger Brentrup, Oelde (DE); Karl Menzel, Ennigerloh (DE); Reinhard Beilmann, Oelde (DE); Detlev Kupper, Telgte (DE); Mark Terry, Roswell, GA (US)

( * ) Notice: Subject to any disclaimer, the term of this patent is extended or adjusted under 35 U.S.C. 154(b) by 257 days.

(21) Appl. No.: 13/386,443

(22) PCT Filed: Aug. 5, 2010

(86) PCT No.: PCT/EP2010/061433
§ 371 (c)(1),
(2), (4) Date: Jan. 23, 2012

(87) PCT Pub. No.: WO2011/018409
PCT Pub. Date: Feb. 17, 2011

(65) Prior Publication Data
US 2012/0118151 A1 May 17, 2012

(30) Foreign Application Priority Data
Aug. 11, 2009 (DE) .......................... 10 2009 036 950

(51) Int. Cl.
*B01D 53/02* (2006.01)
(52) U.S. Cl.
USPC ................... 95/134; 95/108; 95/114; 95/115; 96/126; 96/150
(58) Field of Classification Search
USPC ............... 95/108, 114, 115, 134; 96/126, 150
See application file for complete search history.

(56) References Cited

U.S. PATENT DOCUMENTS

| | | | |
|---|---|---|---|
| 4,273,747 A | 6/1981 | Rasmussen | |
| 4,880,685 A | 11/1989 | Hirth | |
| 5,264,013 A | 11/1993 | Brentrup | |
| 5,460,643 A * | 10/1995 | Hasenpusch et al. | 95/134 |
| 5,695,726 A * | 12/1997 | Lerner | 423/210 |
| 7,854,789 B1 * | 12/2010 | Vidergar | 95/107 |
| 8,133,303 B2 * | 3/2012 | Schwab et al. | 95/107 |
| 2009/0193968 A1 | 8/2009 | Jepsen et al. | |
| 2011/0041690 A1* | 2/2011 | Jepsen et al. | 95/148 |

FOREIGN PATENT DOCUMENTS

CA 1340230 A1 7/1988

* cited by examiner

*Primary Examiner* — Christopher P Jones
(74) *Attorney, Agent, or Firm* — Renner Kenner Greive Bobak Taylor & Weber

(57) ABSTRACT

In the method according to the invention for separating mercury from waste gases of a cement production process, the mercury is sorbed on a sorbent, the sorbent is subsequently discharged from the process and supplied to a discharge reactor which is operated with a carrier gas. The sorbent is heated there to temperatures of more than 250° C. so that the mercury is discharged from the sorbent and changed into the gas phase, the gas of the discharge reactor that has accumulated mercury subsequently having the dust removed from it in a preliminary dust removal device, and only a part-flow of the gas which has been enriched and had the dust removed from it in this manner being drawn off at high temperatures and cleaned in a subsequent sorption stage, whilst the remaining part-flow is brought to the temperature required for the discharge of the mercury in the discharge reactor in a heat transfer system and is again supplied as a carrier gas to the discharge reactor.

22 Claims, 4 Drawing Sheets

1

Figure 1:
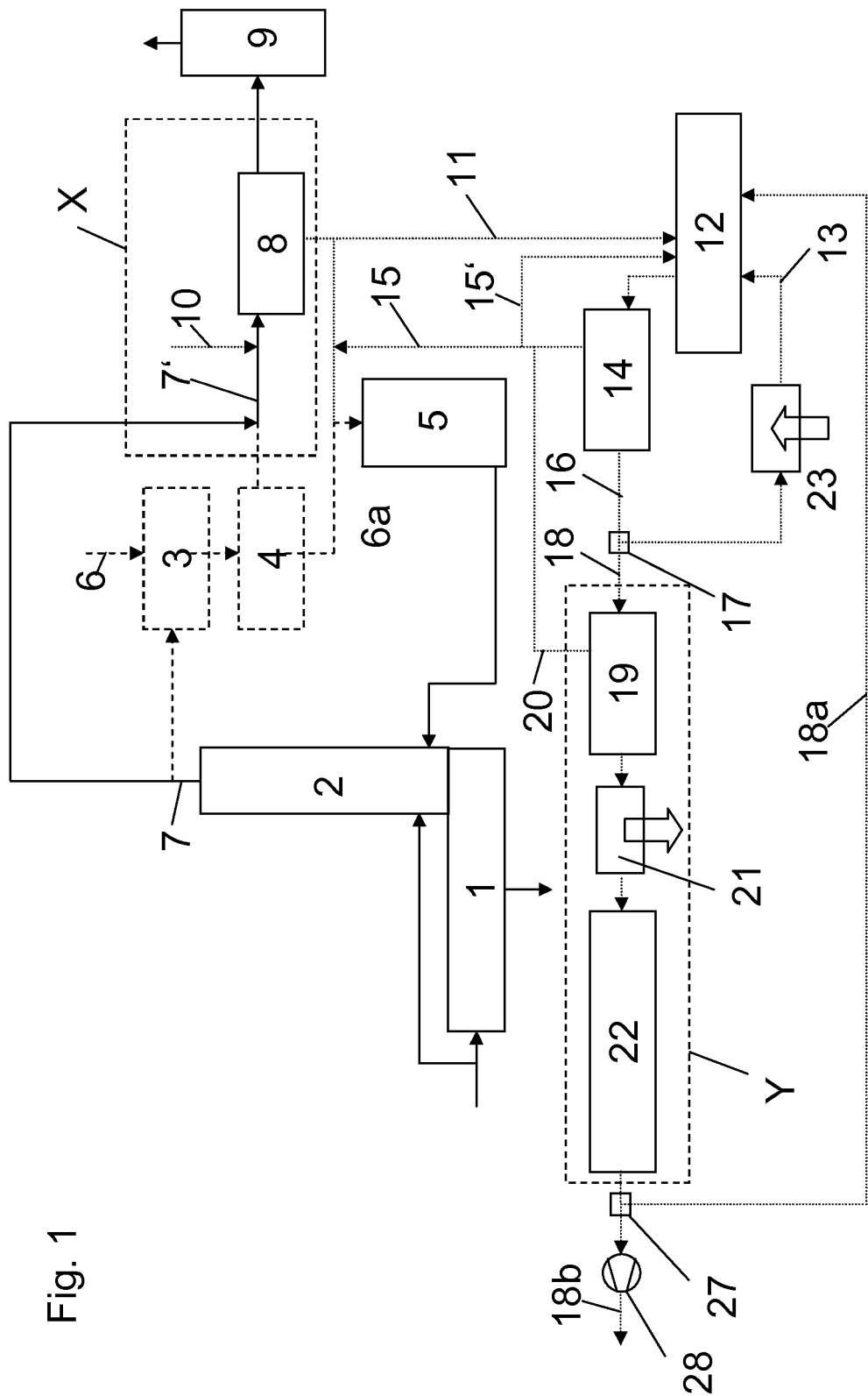

METHOD AND SYSTEM FOR SEPARATING MERCURY FROM WASTE GASES OF A CEMENT PRODUCTION PROCESS

The invention relates to a method and a system for separating mercury from waste gases of a cement production process.

Mercury is a highly volatile heavy metal which is already in the liquid state at ambient temperatures. The boiling point of mercury is 357° C. Owing to these properties, in combustion processes such as cement production, mercury is converted completely into an exhaust gas and is discharged via the chimney. During the production of clinker, mercury is introduced into the process via raw materials and fuels.

The production of clinker generally takes place in two operating states, composite operation and direct operation. After leaving the preheater, the dust-laden exhaust gas is guided to the raw mill in composite operation, where the raw material is ground and dried by the thermal energy of the oven waste gas. After the raw meal has been separated in cyclones, the exhaust gas is guided via a filter (fabric or electrostatic filter) in order to remove dust. In direct operation, the mill is not operated and the oven waste gas is guided directly into the filter after cooling with air or injection of water. The gas from which dust has been removed reaches the atmosphere via the chimney. In composite operation, there is consequently separated in the filter the dust which is discharged both from the oven and by the grinding mill. In contrast, during direct operation, only the dust which originates from the oven is separated.

Owing to the temperature-dependent condensation and adsorption on the raw meal and filter dust, large quantities of mercury are removed from the exhaust gas during composite operation so that existing legal threshold values can frequently be complied with. This is a result of the good sorption of the mercury in the region of the meal drying unit which can be attributed to the intimate gas/solid contact, low temperatures of approximately 90° C. and the generation of very large surfaces owing to the very fine grinding of the cement raw meal to grain diameters of less than 100 μm. The mercury is then accumulated both in the cement raw meal which is separated in the mill cyclones and in the filter dust of the filter which is acted on in composite operation with the finest proportion of the complete milling product.

This sorption of the mercury in the fine particles of the limestone meal leads to a concentration of the heavy metal in the oven system since the bound mercury is driven out of the limestone meal again during the combustion process in order to be bound again in the mill. During the mill running time, the concentration of mercury consequently increases in the oven exhaust gas upstream of the mill and in the ready-ground cement raw meal and in the filter dust.

If the mill is switched off, the waste gas which has accumulated mercury after cooling with air or water directly reaches the filter system. The sorption of mercury in the filter is clearly worse than the sorption in the mill. This is a result of the clearly higher temperatures of approximately 120-180° C. and the poorer mixing of gas and solid material. During direct operation, there is consequently a substantially higher level of mercury emissions and partial relief of the mercury circuit.

In power station technology or waste combustion, the entrained flow method is used to separate mercury. In this instance, sorbents, such as, for example, activated carbons, hearth furnace coke or carbon/calcium mixtures are injected into the exhaust gas. Mercury adsorbs on the sorbent and is consequently separated via the subsequent dust filter. Depending on the exhaust gas temperature, it may be necessary to cool the exhaust gas.

Such a method is described, for example, in DE 30 18 319 A1. Water is injected into the exhaust gas in order to cool the exhaust gas or a calcium suspension is injected in order to promote the sorption of mercury on the dust or calcium. The mercury which has been sorbed is removed with the dust from the exhaust gas.

This method is not sufficient in the cement industry since the sorbent would be separated in a filter with the milling product and the dust would consequently not be able to be discharged. Since the dust must be supplied to the process again, there is therefore no reduction of mercury, but instead a concentration in the process. The alternative of placing a filter exclusively to separate the sorbent from the exhaust gas which has already been cleaned of the process dusts increases the complexity of the system.

It is consequently necessary to prepare the filter dust in composite operation and optionally the sorbent which has been mixed with the filter dust which was injected in the filter in order to improve the sorption, that is to say, to remove the mercury content thereof, so that the material flow can be supplied to the production process again without at the same time causing an accumulation of mercury in the process.

Such a separation method is described in EP 0 299 340 A1. The filter dust is heated to the evaporation temperature of the respective heavy metals. The discharged metals are converted to the liquid or solid state by means of condensation, solidification or sublimation and separated. With this method, there is a periodic material handling process. In this method, owing to the discontinuous operation, in particular the high energy consumption for periodic heating is disadvantageous.

In the patent application EP 0 272 465 A1, a process for separating solid materials in a circuit is set out. The required carrier medium (generally air) can be conveyed in a circuit. In this instance, solid components are removed from the process by means of separators (cyclones and hot gas filters) since the contaminations have been transferred by means of thermal expulsion from the solid materials into the carrier gas. The toxic substances are removed from the gas by means of condensation in one or more subsequent wash towers and a separator and thus changed from the gas phase into the liquid phase.

However, this method has the disadvantage that there is no constant temperature in the gas circuit. The heating in order to release toxic substances and the cooling in order to condense the toxic substances are thus carried out in a circuit. The complete discharge of the solid material in the circuit further places high economic demands on the hot gas filter used.

US 2009/0193968 A1 discloses another method for separating mercury during cement production. In this instance, filter dust containing mercury is brought into contact with hot waste gases in a reaction zone, the mercury being changed into the gas phase. After filtering the dust, there is supplied to the gas containing mercury a sorbent on which the mercury accumulates after cooling. In another filter, the sorbent is finally filtered out again. The method operates with low concentrations of mercury in the gas phase and unnecessarily high structural volumes of the separators. The heating and subsequent cooling of the entire carrier gas is also unfavourable in terms of energy.

DE 41 20 277 A1 further discloses a method for cleaning waste gases from industrial oven installations, filter dust which is separated being heated in a desorption zone in order to remove heavy metal toxic materials which are adsorbed in a carbon-containing filter medium after cooling.

US 2005/0075236A1 discloses a separation of mercury by means of fine dust and a quantity of activated carbon which is additionally injected into the waste gas as a sorbent and subsequent desorption by means of heating.

An object of the invention is to set out a method and a system for separating mercury from waste gases of a cement production process in order to allow continuous separation of mercury, reliable compliance with legal threshold values and recirculation of the dusts with the minimum possible complexity.

This object is achieved according to the invention by the features of claims 1 and 20.

With the method according to the invention for separating mercury from waste gases of a cement production process, the mercury is sorbed on a sorbent, the sorbent is subsequently discharged from the process and supplied to a discharge reactor which is operated with a carrier gas. The sorbent is heated there to temperatures of more than 250° C. so that the mercury is discharged from the sorbent and changed into the gas phase, the gas of the discharge reactor which has accumulated mercury subsequently having the dust removed from it in a preliminary dust removal device and only a part-flow of the gas which has been enriched and had the dust removed in this manner being drawn off at high temperatures and cleaned in a subsequent sorption stage, whilst the remaining part-flow is brought to the temperature required for the discharge of the mercury in the discharge reactor in a heat transfer system and is again supplied as a carrier gas to the discharge reactor.

The carrier gas is guided in a circuit so that the mercury which has been discharged is concentrated in the gas phase and only a part-flow with high mercury concentrations is discharged and cleaned in a subsequent sorption step. The return of the carrier gas is linked with low thermal complexity since the waste gas is not cooled. Only the part-flow discharged with a high concentration of mercury is cooled.

The system according to the invention for carrying out the above method substantially comprises a. a discharge reactor which can be acted on with the sorbent and which can be operated with a carrier gas,
b. a preliminary dust removal device for removing dust from the gas of the discharge reactor which has accumulated mercury,
c. a separation device which is connected to the preliminary dust removal device and which provides two outputs,
d. and a subsequent sorption stage,
one output of the separation device being connected to the sorption stage in order to supply the part-flow and the other output being connected to the discharge reactor by means of a heat transfer system which is arranged upstream of the material supply in order to return and heat the remaining part-flow as a carrier gas.

The dependent claims relate to other configurations of the invention. According to a preferred configuration of the invention, the sorbent is dust from the cement production process, in particular cement raw meal and/or oven dust. There may further be provision for an additional sorbent to be injected into the waste gas of the cement production process and for the sorbent with the accumulated mercury to be separated in a filter and supplied to the discharge reactor.

According to another variant of the method, the dust contained in the waste gas of the cement production process acts as a first sorbent for the mercury, a second sorbent further being added and the first and second sorbent with the accumulated mercury being separated together in a filter and supplied to the discharge reactor.

However, it is also conceivable for a second sorbent to be injected into the waste gas after the filter, the second sorbent with the accumulated mercury being separated in a second filter and the separated first and separated second sorbent being processed separately from each other in the discharge reactor.

The waste gas of the discharge reactor is preferably drawn off continuously at high temperatures and supplied to a separator between the discharge reactor and the subsequent sorption stage, the separated sorbent being supplied to the cement production process or being injected again as a sorbent into the waste gas of the cement production process.

Since only a small gas flow with a high concentration of mercury is discharged and cooled, whilst the remaining part-flow is supplied again as a carrier gas to the discharge reactor, only the heat of the drawn-off part-flow and the heat loss of the discharge reactor has to be supplied as thermal energy to the process. The heat requirement of the discharge reactor can be met, for example, by means of quenchers with waste gases of the cement production process or be provided by means of a heat transmission system, the waste heat of waste gases of the cement production process being indirectly transferred to the carrier gas of the discharge reactor.

The discharge reactor is preferably operated as a fluidised bed reactor.

According to another configuration of the invention, the carrier gas which is guided in the circuit has the dust removed from it after each passage. The part-flow which is drawn off also has the dust removed and is cooled. The mercury of the drawn-off part-flow is removed, for example, by means of adsorption in an activated carbon solid bed or in the entrained flow by means of adsorption of injected activated carbon.

The carrier gas quantity reduced by the drawn-off part-flow for the discharge reactor is compensated for, for example, by process discharge air of the cement production process and/or fresh air and/or recirculation of the cleaned part-flow.

Figure 2:
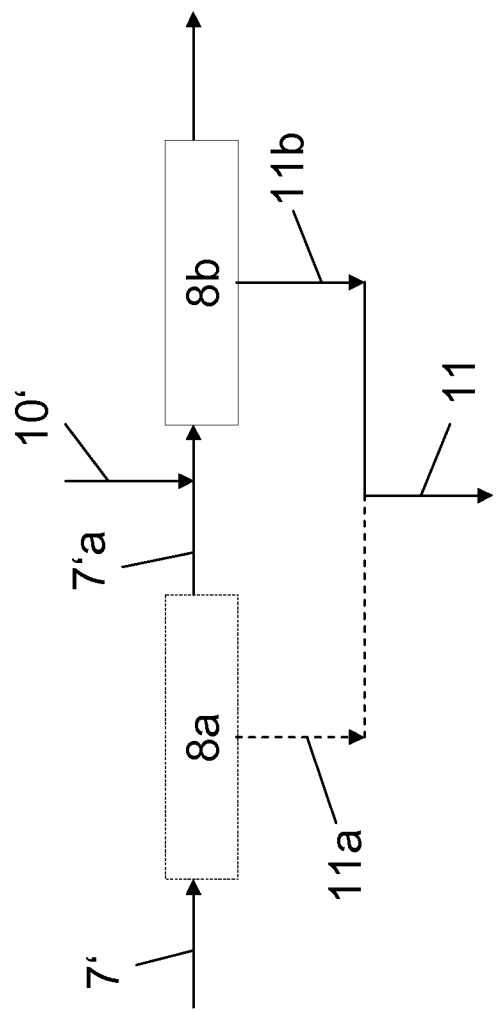
Figure 3:
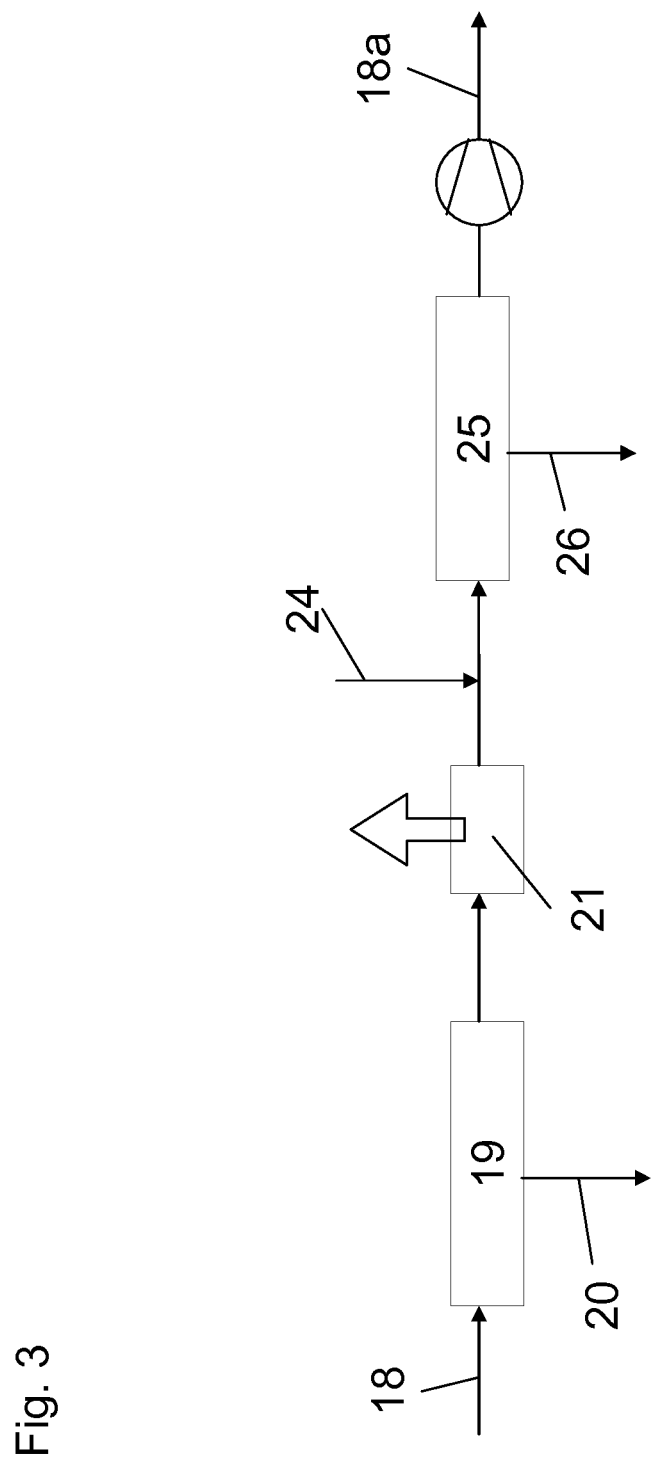
Figure 4:
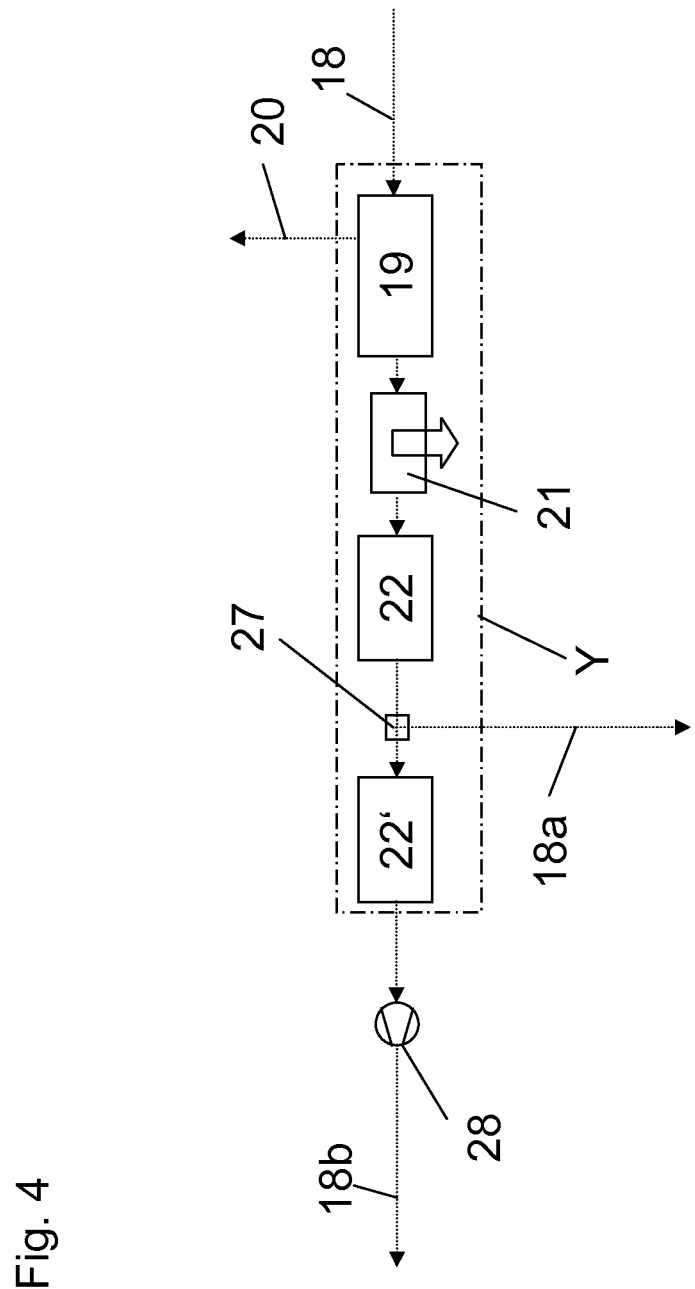

Other advantages and configurations of the invention are explained in greater detail below with reference to the following description and the drawings, in which:

FIG. 1 is a block diagram of a system for cement production and for the separation of mercury, FIG. 2 is an alternative configuration of the separation of the sorbent which has accumulated mercury according to detail X in FIG. 1, FIG. 3 is an alternative configuration of the subsequent sorption stage according to detail Y of FIG. 1, and FIG. 4 is another alternative configuration of the subsequent sorption stage according to detail Y of FIG. 1.

FIG. 1 illustrates a system with all the significant devices for producing cement clinker and for separating mercury from the waste gases of the cement production process.

The installation for production of cement clinker substantially comprises an oven which is generally designated 1, which has a cooler, preheater 2, a raw mill 3, a cyclone 4 and a silo 5.

In so-called composite operation, dust-laden preheater waste gas 7 is at least partially guided to the raw mill 3, where raw material 6 is ground and dried by the thermal energy of the preheater waste gases. After separating the raw meal 6a in the cyclone 4, it is temporarily stored in a silo 5 before it is thermally processed in the preheater, oven and cooler in known manner.

The waste gas of the cyclone 4 and any preheater waste gases 7 which have not been directed to the raw mill 3 are supplied as a waste gas 7' of the cement production process to a filter 8 for dust removal. This may be, for example, a fabric or electrostatic filter. The gas with dust removed reaches the atmosphere via a chimney 9. During composite operation, both the dust from the oven/preheater and the dust from the raw mill 3 is separated in the filter 8.

During direct operation, the raw mill 3 and the cyclone 4 are not used so that only the dust which is emitted by the oven or preheater is separated in the filter 8.

Owing to condensation and adsorption, the mercury accumulates on the dust which is contained in the waste gas. The mercury is separated together with the dust in the filter 8. In composite operation, the mercury is sorbed very well in the region of the meal drying unit, which can be attributed to the intimate gas/solid material contact, the low temperatures of approximately 90° C. and the generation of very large surfaces owing to the very fine grinding of the raw material to grain diameters of less than 100 μm.

However, if the cement system is operated in direct operation mode, the preheater waste gas 7 which has accumulated mercury, after a cooling operation with air or water (not illustrated) directly reaches the filter 8. Since the sorption on the dust is clearly worse in this instance, the injection of an additional sorbent 10, in particular carbon, is particularly advantageous in this case. However, the additional sorbent can also be added in composite operation, in order to further improve the sorption.

The sorbent 11 which is separated in the filter 8 is composed at least of the first sorbent formed by dust and optionally the second sorbent 10, the mercury contained in the waste gas being sorbed on the sorbents. The sorbent 11 is then supplied to a discharge reactor 12 which is operated with a hot carrier gas 13 and which is preferably constructed as a fluidised bed reactor. The discharge reactor 12 is preferably operated with dust loads of the carrier gas 13 of at least 350 g/Nm$^3$.

The sorbent is heated to temperatures of more than 250° C. in the discharge reactor 12 so that the mercury is discharged from the sorbent and is changed into the gas phase. The gas of the discharge reactor 12 which has accumulated mercury subsequently has the dust removed from it in a preliminary dust removal device 14. The dust 15 which is produced is supplied again to the cement production process, in particular the silo 5. However, it is also conceivable for a partial mass flow of the dust 15 to be supplied to the discharge reactor as a partial mass flow 15' either separately from the sorbent 11 or together with the sorbent 11. Owing to recirculation of a partial mass flow, the necessary dwell time for the discharge gases of heavy metals, such as, for example, mercury, can be increased and consequently the waste material concentration in the product can be minimised.

The gas flow 16 which has accumulated mercury leaves the preliminary dust removal device 14 and is supplied to the input of a separation device 17, which provides two outputs, one output of the separation device 17 being connected to a sorption stage Y for supplying a part-flow 18 and the other output being connected to the heat transfer system 23 which is arranged upstream of the material supply and discharge reactor 12 in order to return the remaining part-flow as a carrier gas 13.

In order to enable a high level of mercury separation, an adequate temperature is required in the fluidised bed of the discharge reactor 12. The evaporation of mercury in the elemental state occurs at 357° C. The temperature control is therefore preferably carried out at a temperature of between 360 and 400° C.

If the mercury is present as $HgCl_2$, it can already evaporate at lower gas temperatures. Depending on the required separation level, the mercury evaporation rate and the quantity of mercury that enters the cement production process, a lower temperature may therefore also be sufficient. However, depending on the mercury compound, higher temperatures may also be necessary in order to enable complete changing into the gaseous state. The optimal operating temperature is therefore dependent on the application and should therefore be determined empirically, by the mercury concentration in the dust 15 of the preliminary dust removal device 14 being controlled.

In order to achieve the temperature required for the discharge of the mercury in the discharge reactor 12, there is provided a suitable heat transfer system 23 which transfers, for example, the waste heat of waste gases of the cement production process indirectly to the carrier gas 13 of the discharge reactor 12. However, it is naturally also conceivable in the heat transfer system 23 for a hot waste gas flow from the cement production process or a hot gas flow produced in a hot gas producer to be mixed with the partially circulating gas flow 16 and for the quantity of heat required for heating the solid material and discharging the mercury to be provided. The heating of the part-flow 13 returned to the discharge reactor can be carried out in the heat transfer system 23 with low dust contents with a better degree of efficiency than with high dust contents since the dust loading of the partially circulating gas flow 16 was reduced in the preliminary dust removal device 14. In particular when the heat transfer system 23 is constructed as an indirect heat exchanger, an efficient reduction of the dust concentration in the gas phase is necessary. The formation of fur on the pipes is thereby substantially reduced and the degree of efficiency of the heat exchanger is improved compared with high dust loads.

The hot part-flow 18 which is branched-off in the separation device 17 and which is supplied to the sorption stage Y is less than 50%, preferably less than 25%, most preferably less than 5%. It is advantageous for the lower limit to be at least 1%. This part-flow 18 first has the dust almost completely removed in a high temperature filter 19. The separated solid materials 20 can again be supplied to the cement production process.

Subsequently, a lowering of the temperature and consequently a reduction of the thermal energy content is required in order to then allow adequate adsorption of the mercury. The energy discharge is enabled, for example, by means of a heat exchanger 21 or quencher.

Subsequently, there is provided an activated carbon solid bed 22 at which the sorption is carried out. The part-flow cleaned in this manner can be introduced to the discharge reactor 12 again by means of a separation device 27, for example, as a part-flow 18a or any part-flow 18b can be directed into the atmosphere via a chimney. As long as a part-flow 18b is discharged, that is to say, is not recirculated in the discharge reactor 12, the quantity of gas missing therein must be replaced by other process waste air of the cement system and/or fresh air and/or another hot gas source so that the gas flow 16 remains constant. However, it is also conceivable to couple the waste gas flow 18b at a suitable location, for example, in the region of the cooler, in the region of the preheater or waste gas line of the cement production process. When the heat transfer system 23 is constructed as an indirect gas/gas heat exchanger, it may also be advantageous to introduce the exhaust gas from the heat exchanger at a suitable location. This may then be advantageous when the number of emission sources requiring monitoring is intended to be limited.

The system for cleaning mercury from the sorbent is preferably operated at reduced pressure in order to be able to reliably exclude undesirable emission of mercury from the system. For example, a ventilator 28 ensures the base low pressure level in the system. The part-gas flow 18b which is drawn with this ventilator must then be replaced by a corresponding quantity of fresh gas. This fresh gas flow may be waste process air from the cement installation and/or fresh air and/or another hot gas source.

FIG. 2 illustrates a variant for discharging the sorbent from the cement production process (as a replacement of the detail X of FIG. 1) which can be used in particular in direct operation of the cement installation, that is to say, with the raw mill 3 switched off. Two filters 8a and 8b which are arranged one behind the other are provided in this instance. The dust contained in the waste gas 7' of the cement production process acts as a first sorbent for the mercury and is separated in the first filter 8a. There is injected into the remaining waste gas 7'a a second sorbent 10', preferably a carbon-containing sorbent, on which another part of the mercury still contained in the waste gas accumulates.

The sorbent 11a or 11b which is separated in the filter 8a or 8b can be supplied to the discharge reactor 12 either together or separately from each other. In the case of separate supply, it is possible to inject the sorbent separated in the dust removal device 14 into the waste gas again.

FIG. 3 illustrates an alternative configuration of the sorption stage Y. In this instance, the concentrated and separated part-flow 18 first also has the dust almost completely removed in a high temperature filter 19, the separated solid materials 20 again being able to be returned to the cement production process. Subsequently, a reduction of the temperature and consequently a reduction of the thermal energy content is also necessary. The energy removal is, for example, possible in a heat exchanger 21 or by means of quenchers. In place of the activated carbon filter 22 provided in FIG. 1, in the embodiment according to FIG. 3 the entrained flow method for removing mercury in concentrated gas is used. To this end, for example, activated carbon 24 is injected. In a subsequent filter 25, the carbon material 26 which is loaded with mercury is separated and removed as a waste product. The cleaned part-flow 18a can be used again in the discharge reactor 12 or can be discharged via the chimney into the environment.

If, in the variant disclosed in FIG. 2, the sorbent 11b separated in the filter 8b is processed separately from the sorbent 11a in the discharge reactor 12, there is substantially no dust in the waste gas, so that it is possible to dispense with the high temperature filter 19 in FIG. 3.

FIG. 4 illustrates another alternative configuration of the sorption stage Y. Also in this instance, dust is first almost completely removed from the concentrated and separated part-flow 18 in a high temperature filter 19, the separated solid materials 20 again being able to be returned to the cement production process. Subsequently, a reduction of the temperature and consequently a reduction of the thermal energy content is also necessary. The energy removal is possible, for example, in a heat exchanger 21 or by means of quenchers. In addition to the activated carbon filter 22 provided in FIG. 1, in the embodiment according to FIG. 4, another activated carbon filter 22' which is structurally identical to the activated carbon filter 22 is arranged downstream and cleans the gas flow 18b of any toxic materials, for example, mercury, which are present. Using the flow divider 27, the part-gas flow 18a in this variant is drawn-off between the two activated carbon filters and supplied to the discharge reactor. This is advantageous when the solid bed filter 22 is so heavily laden with toxic materials that toxic materials break through. The second activated carbon filter ensures that the toxic material emission from the system remains minimal. When specific activated carbons are used, very high concentrations of, for example, more than 10% by weight of mercury on activated carbon can be achieved.

The invention claimed is:

1. Method for separating mercury from waste gases of a cement production process, the mercury being sorbed on a sorbent, the sorbent being discharged from the process and supplied to a discharge reactor which is operated with a carrier gas, where the sorbent is subsequently heated to temperatures of more than 250° C. so that the mercury is discharged from the sorbent and changed into the gas phase, the gas of the discharge reactor that has accumulated mercury subsequently having the dust removed from it in a preliminary dust removal device, characterised in that only a part-flow of the gas which has been enriched and had the dust removed in this manner being drawn off at high temperatures and cleaned in a subsequent sorption stage, whilst the remaining part-flow is brought to the temperature required for the discharge of the mercury in the discharge reactor in a heat transfer system and is again supplied as a carrier gas to the discharge reactor.

2. Method according to claim 1, characterised in that the sorbent is dust from the cement production process, in particular cement raw meal and/or oven dust.

3. Method according to claim 1, characterised in that the sorbent with the accumulated mercury is separated in a filter and supplied to the discharge reactor.

4. Method according to claim 1, characterised in that the dust contained in the waste gas acts as a first sorbent for the mercury and in that a second sorbent is added and the first and second sorbent with the accumulated mercury are separated together in a filter and supplied to the discharge reactor.

5. Method according to claim 3, characterised in that a second sorbent is injected into the waste gas after the filter, the second sorbent with the accumulated mercury being separated in a second filter and the separated first sorbent and separated second sorbent being processed separately from each other in the discharge reactor.

6. Method according to claim 1, characterised in that the treatment of the waste gas in the discharge reactor is carried out in a fluidised bed.

7. Method according to claim 1, characterised in that the waste gas between the discharge reactor and the subsequent sorption step is supplied to a dust removal device, the separated sorbent being supplied to the cement production process or being injected again as a sorbent in the waste gas.

8. Method according to claim 1, characterised in that the heat requirement of the discharge reactor is carried out by means of quenchers with waste gases of the cement production process.

9. Method according to claim 1, characterised in that the heat transfer system transfers the waste heat of waste gases of the cement production process indirectly to the carrier gas.

10. Method according to claim 1, characterised in that the heat requirement is met by the supply of fuel.

11. Method according to claim 1, characterised in that the carrier gas which is guided in the circuit has the dust removed from it after each passage.

12. Method according to claim 1, characterised in that the part-flow of the enriched gas is continuously drawn off at high temperatures.

13. Method according to claim 1, characterised in that the drawn off part-flow has the dust removed from it and is cooled.

14. Method according to claim 1, characterised in that the mercury is removed from the drawn-off part-flow by adsorption on at least one activated carbon solid bed.

15. Method according to claim 1, characterised in that the mercury in the entrained flow is removed from the drawn-off part-flow by means of adsorption on injected activated carbon.

16. Method according to claim 1, characterised in that the part-flow which is cleaned in the sorption stage is completely or partially returned to the discharge reactor or discharged from the circuit, the carrier gas quantity which is not returned for the discharge reactor being compensated for by waste process air of the cement production process and/or fresh air.

17. Method according to claim 1, characterised in that the dust which has been separated is partially returned again to the discharge reactor.

18. Method according to claim 1, characterised in that at least part of the waste gases cleaned of mercury is again supplied to the cement production method.

19. Method according to claim 1, characterised in that at least part of the waste gases which have been cleaned of mercury is discharged via a ventilator and the method for separating mercury from waste gases is thereby operated with permanent reduced pressure.

20. System for separating mercury from waste gases of a cement production process in which mercury is sorbed onto a sorbent, the system comprising:

a. a discharge reactor supplied with the sorbent and operated with a carrier gas,
b. a preliminary dust removal device removing dust from gas that has accumulated mercury in the discharge reactor,
c. a separation device receiving gas from the preliminary dust removal device, the separation device providing first and second outputs,
d. and a sorption stage, wherein the first output of the separation device is connected to the sorption stage and supplies a partial flow of the gas received from the preliminary dust removal device to the sorption stage and the second output is connected by means of a heat transfer system to the discharge reactor and returns the remaining flow of the gas received from the preliminary dust removal device to the discharge reactor to serve as a carrier gas after the heat transfer system brings the temperature of the remaining flow to a temperature required for the discharge of the mercury in the discharge reactor.

21. System according to claim 20, characterised in that the discharge reactor is constructed as a fluidised bed reactor.

22. Method according to claim 1, characterised in that the sorption stage is provided with at least two activated carbon filters which are constructed as solid bed filters.

* * * * *